(12) United States Patent
Bernardini et al.

(10) Patent No.: US 11,589,553 B2
(45) Date of Patent: Feb. 28, 2023

(54) COVER FOR A CAGE FOR LABORATORY ANIMALS, AND CAGE FOR LABORATORY ANIMALS INCLUDING SAID COVER

(71) Applicant: TECNIPLAST S.P.A., Buguggiate VA (IT)

(72) Inventors: Pietro Bernardini, Casciago (IT); Simone Cassetti, Legnano (IT); Giovanni Malnati, Malnate (IT)

(73) Assignee: TECNIPLAST S.P.A., Buguggiate VA (IT)

( * ) Notice: Subject to any disclaimer, the term of this patent is extended or adjusted under 35 U.S.C. 154(b) by 202 days.

(21) Appl. No.: 16/032,987

(22) Filed: Jul. 11, 2018

(65) Prior Publication Data

US 2019/0014740 A1  Jan. 17, 2019

(30) Foreign Application Priority Data

Jul. 13, 2017 (IT) .................. 102017000078916

(51) Int. Cl.
  *A01K 1/03*   (2006.01)
  *A01K 1/00*   (2006.01)
  *A01K 7/00*   (2006.01)

(52) U.S. Cl.
  CPC ............ *A01K 1/031* (2013.01); *A01K 1/0058* (2013.01); *A01K 7/00* (2013.01)

(58) Field of Classification Search
  CPC ......... A01K 1/031; A01K 1/0245; A01K 1/03
  See application file for complete search history.

(56) References Cited

U.S. PATENT DOCUMENTS

| | | | | |
|---|---|---|---|---|
| 920,975 | A * | 5/1909 | Minion | A01K 1/033 119/482 |
| 3,234,907 | A | 2/1966 | Palencia | |
| 4,402,280 | A * | 9/1983 | Thomas | A01K 1/031 119/418 |
| 4,576,115 | A * | 3/1986 | Gordon | A01K 63/006 119/265 |
| 6,257,171 | B1 * | 7/2001 | Rivard | A01K 1/031 119/419 |
| 8,181,603 | B2 * | 5/2012 | Tartaglia | A01K 1/031 119/417 |
| 2004/0090028 | A1 * | 5/2004 | Trogstam | A01K 1/031 280/79.3 |

(Continued)

FOREIGN PATENT DOCUMENTS

| | | | |
|---|---|---|---|
| DE | 102005008695 | 8/2006 | |
| DE | 102009024081 A1 * | 12/2010 | ............. B65D 19/18 |

(Continued)

OTHER PUBLICATIONS

EP 2537769A1 machine translation (Year: 2012).*

(Continued)

*Primary Examiner* — Son T Nguyen
(74) *Attorney, Agent, or Firm* — Stetina Brunda Garred and Brucker

(57) ABSTRACT

A cage for housing laboratory animals, said cage comprising a tray and a cover which can be removed and switched between a first closing position, in which it is positioned on said tray thus stopping the access to the internal space delimited by said tray, and a second opening position, in which said internal space may be accessed.

15 Claims, 10 Drawing Sheets

(56) References Cited

U.S. PATENT DOCUMENTS

| | | | |
|---|---|---|---|
| 2006/0254528 A1 | 11/2006 | Malnati et al. | |
| 2007/0193527 A1* | 8/2007 | Verhage | A01K 1/031 119/418 |
| 2012/0234255 A1* | 9/2012 | Bernardini | A01K 1/031 119/417 |
| 2016/0174519 A1* | 6/2016 | Chang | A01K 1/031 119/419 |

FOREIGN PATENT DOCUMENTS

| | | | |
|---|---|---|---|
| DE | 102012018230 | 3/2013 | |
| EP | 2151158 | 2/2010 | |
| EP | 2537769 | 12/2012 | |
| EP | 2868592 A1 | 5/2015 | |
| EP | 2886484 | 6/2015 | |
| JP | S1979073115 U | 5/1979 | |
| JP | 3106551 U | 1/2005 | |
| JP | 2006311863 A | 11/2006 | |
| WO | WO-2008135528 A2 * | 11/2008 | A01K 1/031 |
| WO | 2016166234 | 10/2016 | |

OTHER PUBLICATIONS

DE-102009024081-A1 machine translation (Year: 2010).*
Ministero Dello Sviluppo Economico, Italian Search Report and Written Opinion for Italian Application No. 201700078916, dated Mar. 16, 2018, 9 pages.

* cited by examiner

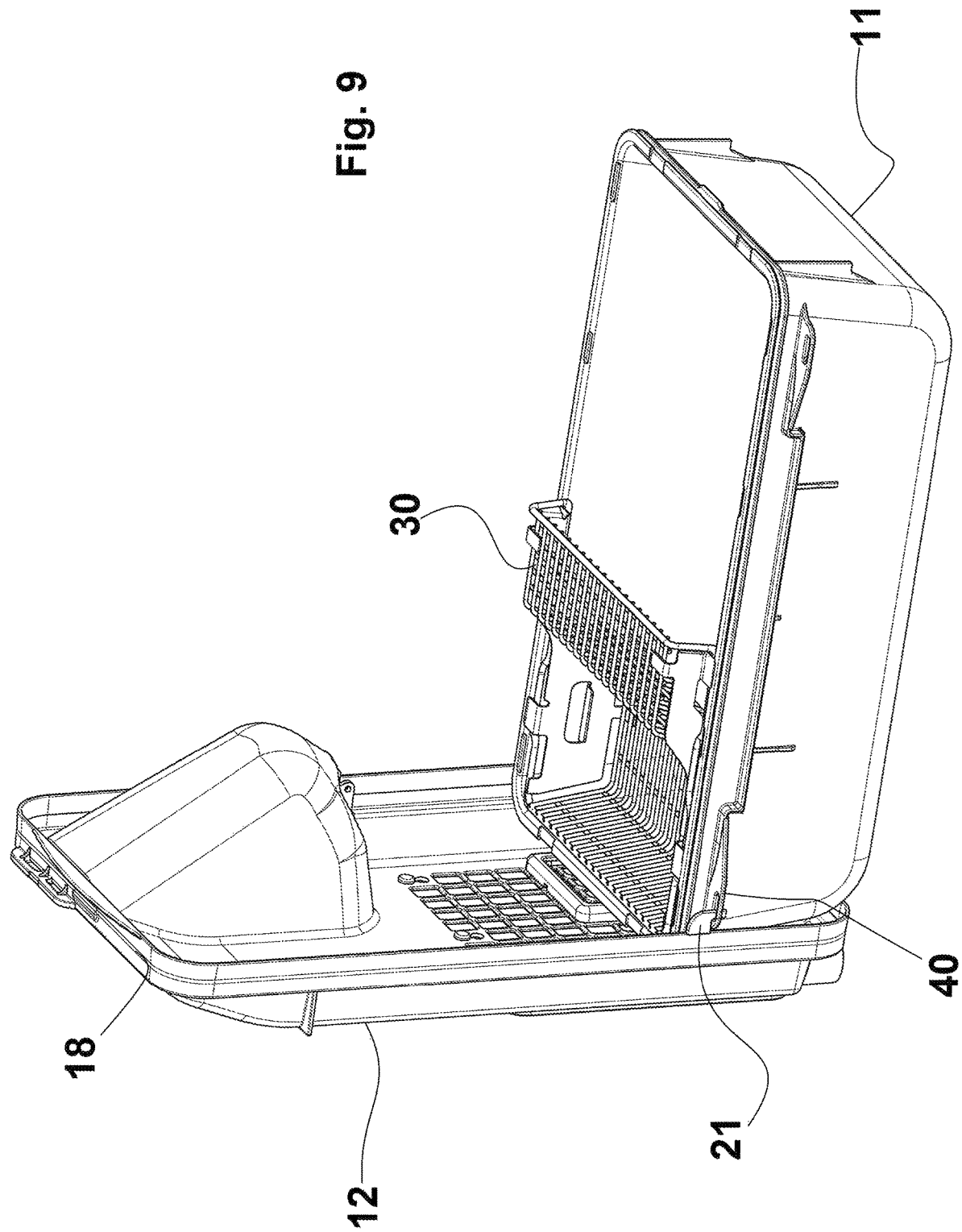

COVER FOR A CAGE FOR LABORATORY ANIMALS, AND CAGE FOR LABORATORY ANIMALS INCLUDING SAID COVER

CROSS-REFERENCE TO RELATED APPLICATIONS

The present application claims priority to Italian Patent Application No. 102017000078916 filed Jul. 13, 2017, the entirety of the disclosure of which is expressly incorporated herein by reference.

STATEMENT RE: FEDERALLY SPONSORED RESEARCH/DEVELOPMENT

Not Applicable

TECHNICAL FIELD OF THE INVENTION

The present invention belongs to the field of housing laboratory animals. In particular, the present invention relates to a cage for housing laboratory animals. In detail, the present solution relates to a cage of the kind identified above, provided with a novel opening and access system. In greater detail, the novel system according to the present invention relates to handling and positioning the cover of a cage of the aforesaid type.

BACKGROUND ART

To date, the use is widespread of cages for housing laboratory animals such as for example, small rodents or the like, the cages having variable sizes and shapes according to the number of animals to be housed and the conditions to be ensured to the animals themselves. For example, the use is widespread of "ventilated" cages, namely of cages in which a flow of forced air taken from a main circuit is caused to circulate.

However, in addition to specificities provided according to needs and/or circumstances, the cages of known type or at least those most commonly used essentially comprise a tray designed to contain the litter and a cover (also called top hereinafter); moreover, there is usually housed a third component in the tray, the trough, which is designed to contain the food in accessible position for the animals and so that the food does not come into contact with the litter. Finally, a bottle with the drinking water may be prepared inside the cage or also outside and resting on the cover.

The cover or top is positioned above the tray (and possibly fastened to the tray by means of suitable closing means such as clips or the like) and the desired seal is ensured due to a seal positioned between the two elements so that the tray-cover system is adequately isolated from the external environment, where the users of the housing operate, thereby avoiding contaminations both of the housing towards the inside of the cage, and from the inside of the cage towards the housing or external environment.

It indeed is to be considered that in most cases, the housing relates to "clean" animals, in particular called "SPF", specific pathogen free, wherein the volume and the inner surfaces of the cage in the case of "clean" animals are kept and are considered "clean", while everything outside the cage, including the external surface of the cage itself, is considered potentially "dirty" and contaminated.

To the contrary, the opposite concept applies in the case of potentially contaminated animals, in particular from a microbiological viewpoint, wherein t everything inside the cage is considered "dirty" and therefore potentially contaminating for the outside, including the operators.

In both cases, however, the primary need arises to avoid the exchanges and/or mixtures (in particular microbiological contaminations) of what is confined inside the cage and what is outside thereof, thereby maintaining the concept of aseptic conditions.

Therefore, it is apparent that all the operations requesting opening the cage, and in particular removing the cover, are to be carried out according to methods such as to avert the aforesaid mixtures and therefore any contamination of the cage and of the accessories therein and of the animals, but also of the external environment and in particular, of the operators. Such operations comprise for example, but not exclusively, changing the cage (in order to put the animal in a new tray with clean and dry litter, new food and sometimes fresh water), taking and relocating the animals according to the gender and before they reach reproduction maturity, wherein removing the cover is required also in the case of "procedures", such as for example, specific experiments, weighing the animals, injecting and/or taking samples of biological liquids, diagnostics, health check-ups, surgical interventions, etc., and wherein according to the most common methods implemented, the aforesaid operations are carried out in controlled atmosphere in change or microbiological safety cabinets.

Said microbiological safety cabinets, also more simply referred to as cage changes, essentially comprise a work surface struck by a flow of barrier gas, in particular of barrier air, which is perpendicular to the work surface, and possibly by a further flow substantially parallel to the work surface, said work surface being closed on two/three sides by means of fixed walls and accessible from one side at which there is prepared a vertical sliding window, wherein, due to the calibration of the one or more barrier flows taken from peripheral slits provided along the outer perimeter of the work surface, an attempt is made to obtain the desired protection and to avert the aforesaid contaminations of animals and/or cages and/or components and/or operator. In practice, the air walls prevent that which is outside the work surface from contaminating the material inside, and that which is inside and potentially contaminated from being outlet from the laminar flow system and reaching operators and environment.

However, the cages of known type complicate the operations summarized above, even compromising the effectiveness and/or reliability thereof.

Indeed, each of the operations summarized above necessarily requires handling the cover which is in particular to be first removed from the seat thereof on the tray, then positioned on the work surface (generally beside trays or in rear position, paying attention that the internal surfaces do not to come into contact with the work surface or other instruments resting thereon), and finally gripped (ensuring not to touch the inner surface thereof), removing it from the position thereof on the work surface and relocating it in the seat thereof above the tray, thereby reclosing the cage.

However, handling the cover results in a series of drawbacks, essentially due to the limited space on the work surface.

For example, when the cage is changed, both the "dirty" cage, with the animals and the used litter, and the new sterile "clean" cage are necessarily present on the work surface of the cabinet, with the apparent risk of accidental contact between "dirty" components and "sterile" components and that the dirty cover comes into contact with clean components.

In the same way, on occasion of the separation of the genders, there are at least three cages present on the work surface of the cabinet: the original "dirty" one where there is contained the litter and at least two "clean" cages at the sides, each designed to receive the animals of one or the other gender; clearly the risk of contact between dirty components and clean components, in particular between the dirty cover and clean components, is increased here in consideration of the increased number of components to be arranged on the work surface.

In consideration of that disclosed above, the problems and/or drawbacks encountered in handling or managing the cages according to the prior art, in particular the covers of the cages according to the prior art, may be classified in the following groups.

1) Risk of contamination of the parts inside the cage and therefore of the animals, with external parts of the cage or with other objects 2) Risk of contamination of the operators 3) Risk of interrupting the integrity of the laminar flow and aseptic conditions inside the work cabinet 4) Ergonomic risk due to repetitive movements 5) Human risk due to the lack of a clear procedure guiding the operator Concerning the risks under item 1), same are at least partly due to the fact that, for example, the hands of the operator may accidentally come into contact with the internal parts of the cover during each of the three handling steps described above. Moreover, when the cover is placed on the work surface, the internal parts thereof may touch potentially contaminated parts such as external parts of the cage itself, the work surface, containers, potentially contaminated test tubes or bottles present within the laminar flow. Finally, it is worth noting that such operations become difficult by the obligation—or at least the opportunity—for the operators to wear gloves, which decrease the friction and sensitivity of the operator's hands, by the minimal spaces inside of which the protection is ensured, and also by the front safety glass which certainly limits the freedom of movement of the arms.

Concerning the risks under item 2), it is worth noting that while the risk in housing generally is associated with the contamination of the animals by pathogens introduced by the operators or already present in the rooms of the housings, the same potential problems described above could result in the contamination of the operators and of the surrounding environment by animals that might host microbiological agents.

Concerning the risks under item 3), it is worth noting that as described above, the restricted area of the work surface often is crowded or occupied because, in addition to the trays being changed, there may be present a plurality of tools useful for the operations, such as containers for disinfectant and/or for the food, bottles for the water, test tubes, cups for microbiological screening, etc.

Such objects are to be carefully positioned inside the sterile area because if they are even briefly positioned outside during the handling and then used, they themselves could become contaminated or contaminate the environment; moreover, such objects may not be positioned along the perimeter of the laminar flow area because by obstructing the air intakes, they could nullify the protection normally ensured by the sterile flow curtain.

Therefore, the risk of human errors which may compromise the required sterility is high.

Concerning the risks under item 4, it is worth noting that even hundreds of cages are changed by a single operator every day in a housing facility: such a procedure results in the repetition of the same movements mainly by the wrist, fingers, elbow and shoulder of the animal care takers, such as opening the cover, positioning it on the work surface generally beside the tray and successively closing it, which result in a rotation of the wrist and of the hand by at least 180 degrees, first in one direction and then in the other. It is known that pathologies such as that of carpal tunnel may affect such operators, also due to these movements.

Finally, concerning the risks under item 5, it is to be noted that regardless of the system and the brand of cage used, no clear procedure for accessing the IVCs exists to date: each facility implements standard operations which tend to minimize the above-described risks, but there is no optimized process recommended by the suppliers because there is no system that simplifies, rationalizes and increases the safety and repeatability of such an operation.

In an attempt to overcome the drawbacks described above and therefore to reduce in particular the risks according to items 1) to 5), support devices have recently been proposed called "top holders", for supporting the cover (top) of the cage when the same is removed from the tray. In use, said supports are in particular positioned on the work surface of the change cabinet and when the cover is removed from the tray, same is positioned on one of them. Therefore, said supports at least partly facilitate the task of the operator, who knows where to position the cover; moreover, they limit the risk of the (dirty) inner surface of the cover coming into contact with clean components and/or being touched by the operator's hands.

However, although the top holders can be appreciated for the aforesaid reasons, they nevertheless have various drawbacks and do not provide a significant and complete solution to the problems disclosed above.

Indeed, also the top holder type systems present on the market are themselves to be positioned in fixed position on the already restricted work surface, thus occupying a portion thereof and restraining the handling of the cages.

Moreover, being placed externally to the cage on the sides or in rear position, they require an even larger handling space for the operator when they are opened and closed, with respect to that available in the absence thereof.

Therefore, it is the main object of the present invention to overcome or at least minimize the problems summarized above and encountered in the prior art.

In particular, it is a first object of the present invention to provide a solution which allows the facilitated handling of the cover of a cage for laboratory animals, thus limiting the risks of contamination. In detail, it is an object of the present invention to propose a solution which allows repositioning the cover by means of operations that are quick, safe and simple to be carried out. In greater detail, it is an object of the present invention to propose a solution which allows the aforesaid repositioning of the cover but at the same time does not complicate the operations of removing the cover, if desired and/or required.

DESCRIPTION OF THE PRESENT INVENTION

In consideration both of the drawbacks encountered in the prior art and of the pre-set objects or goals, the object of the present invention according to a first embodiment is a cage for housing laboratory animals, said cage comprising a tray and a cover which can be removed and switched between a first closing position, in which it is positioned on said tray, thus stopping the access to the internal space delimited by said tray, and a second opening position in which said internal space may be accessed, when said cover comprises constraining means, when with the cover in said first closing position, said constraining means do not engage said tray, when contrarily, in said second opening position said constraining means engage a portion of said tray, and when said second position of said cover with respect to said tray is defined by the mutual engagement of said constraining means and said portion of said tray.

According to one embodiment, said constraining means are conformed in such a way that when said cover is in said second opening position, at least one portion of said cover is positioned adjacent to a side wall of the tray, and said cover is substantially parallel to said side wall of said tray.

According to one embodiment, said constraining means are conformed in such a way that when said cover is in said second opening position and said tray is resting on a plane, said cover is raised in respect to said plane.

According to one embodiment, said constraining means comprise at least one hook rigidly constrained to said cover and conformed so as to define a housing and engagement seat, when with said cover in said second opening position said at least one portion of said tray engaged by said constraining means is at least partially housed in said housing and engagement seat defined by said at least one hook.

According to one embodiment, said at least one portion of said tray at least partially housed in said housing and engagement seat defined by said at least one hook, is represented by a portion of a side wall of said tray.

According to one embodiment, said at least one portion of said tray at least partially housed in said housing and engagement seat defined by said at least one hook, is represented by an end portion of a side wall of said tray close to the upper edge of said side wall.

According to one embodiment, said at least one portion of said tray at least partially housed in said housing and engagement seat defined by said at least one hook, is represented by a portion of a side wall of said tray which extends from said side wall outwards from said tray.

According to one embodiment, said cover comprises a main, substantially flat portion, when said at least one hook extends from the inner surface of said main portion facing the inside of said tray with said cover in said first closing position.

According to one embodiment, said cover comprises a main, substantially flat portion and a side wall joined to said substantially flat portion, when said at least one hook extends from said side wall of said cover.

According to one embodiment, said constraining means comprise two of said hooks.

According to one embodiment, said cage comprises at least one trough designed in use to be placed inside said cage.

According to one embodiment, said cover defines a depression adapted to at least partially house a container for liquids, for example drinking water.

According to one embodiment, said cage is of the ventilated type, when said cover comprises means for inletting ventilated air into said cage.

Possible further embodiments of the present invention are defined in the claims.

BRIEF DESCRIPTION OF THE DRAWINGS

The present invention will be further clarified below by means of the following detailed description of the possible embodiments depicted in the drawings in which features and/or corresponding or equivalent component parts of the present invention are identified by the same reference numerals. It is to be noted that the present invention is not limited in any case to the embodiments described below and depicted in the drawings; contrarily, all those variants and/or modifications of the embodiments described below and depicted in the accompanying drawings, which are clear and apparent to those skilled in the art, fall within the scope of the present invention.

In the drawings:

FIGS. 8 and 9 show perspective views of a cover of a cage according to one embodiment of the present invention and of a cage according to one embodiment of the present invention with the cover in opening position, respectively.

DETAILED DESCRIPTION

The present invention is particularly applicable in the field of housing laboratory animals, this being the reason why the present invention is described below with particular reference to the applications thereof in the field of housing animals.

It is in any case worth noting that the possible applications of the present invention are not limited to those described below. Contrarily, the present invention is conveniently applied in all those cases in which there is a need to optimize the opening of a container including a main containment portion and a cover which can be switched between a first opening position, in which it stops the access to the inside of said main portion, and a second opening position, in which contrarily the inside of said main portion is allowed and/or possible.

Figure 1:
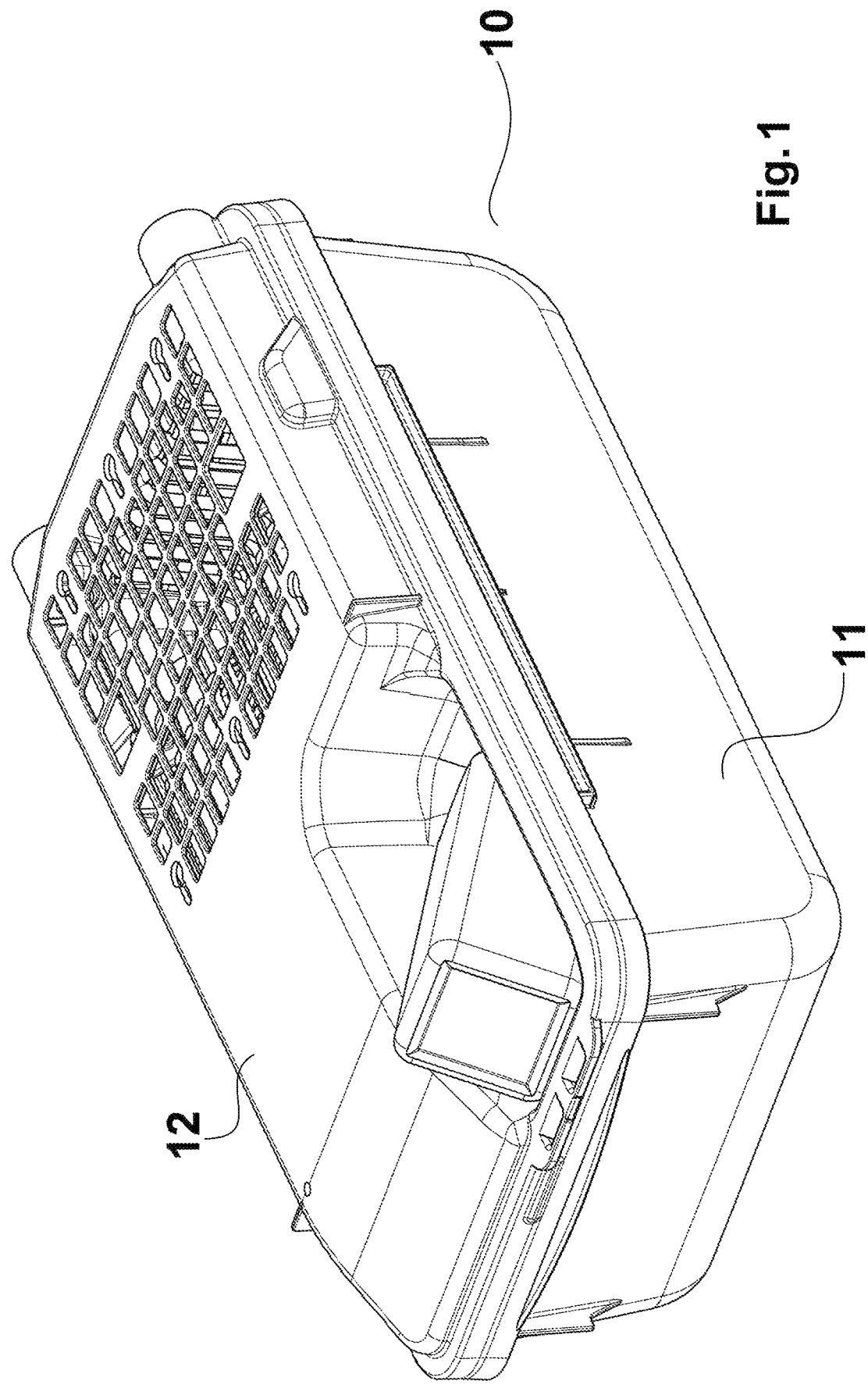
FIG. 1 shows a perspective view of a cage according to one embodiment of the present invention.
Figure 2:
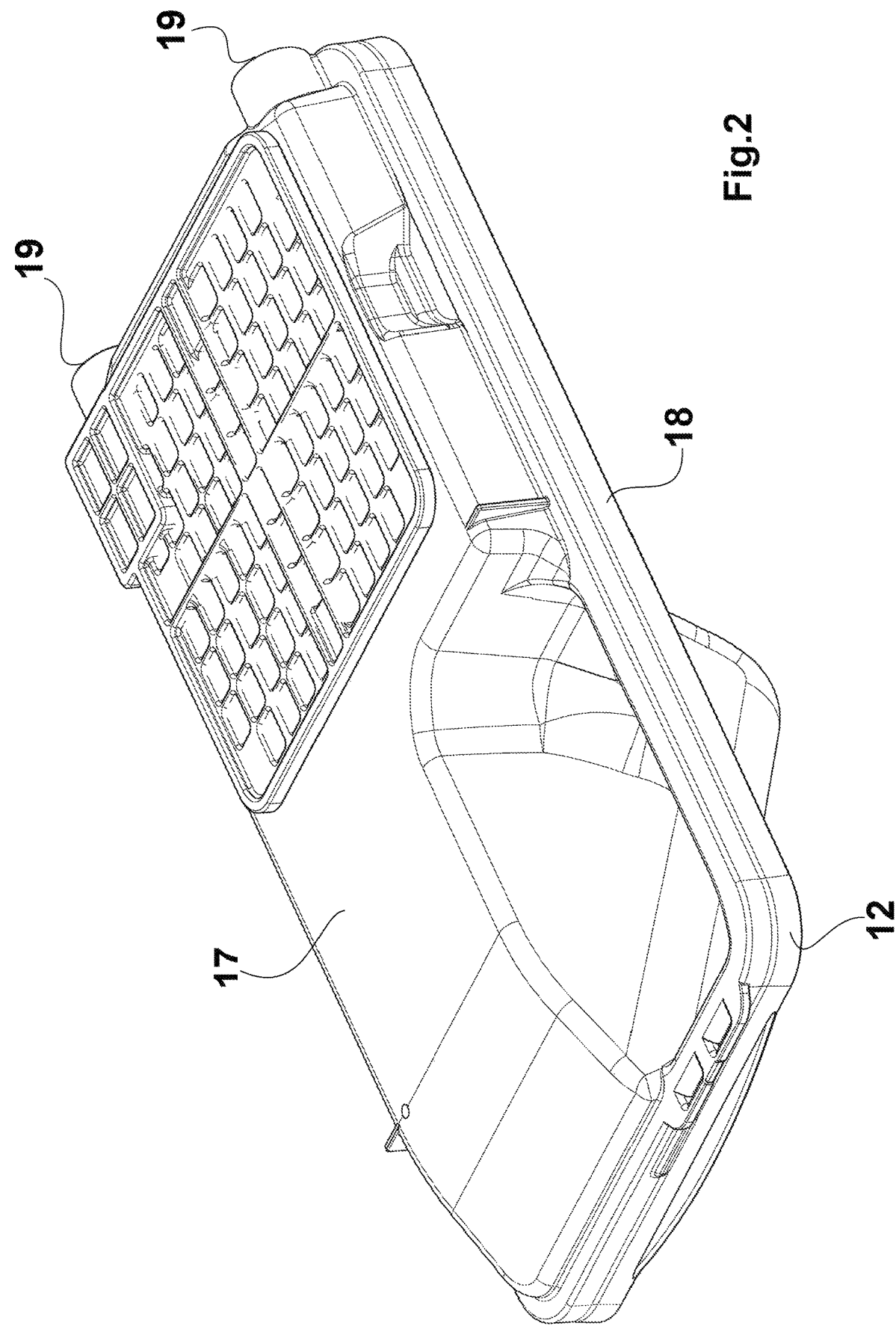
FIG. 2 shows a perspective view of a cover of a cage according to one embodiment of the present invention.
Figure 3:
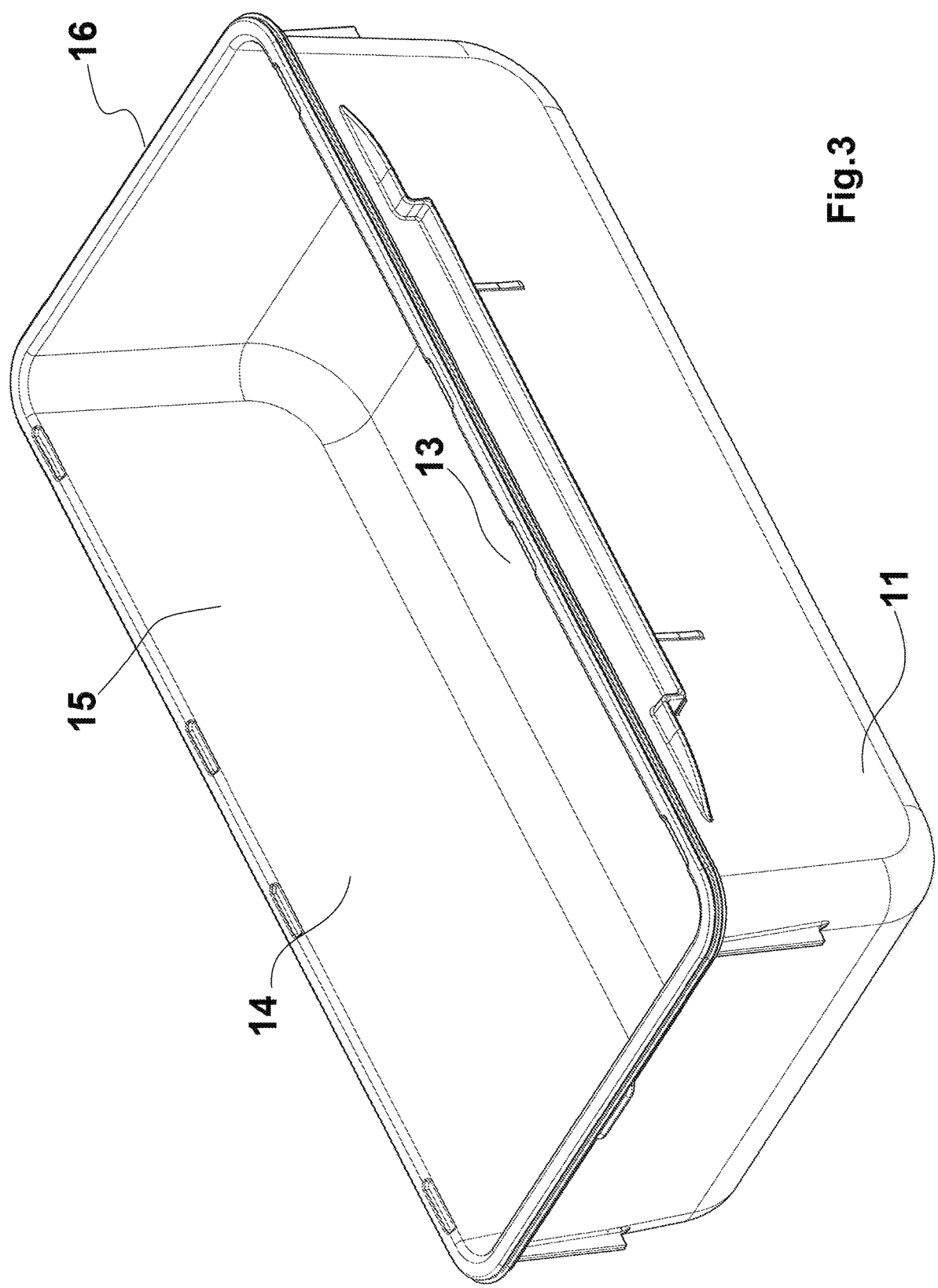
FIG. 3 shows a perspective view of a tray of a cage according to one embodiment of the present invention.
Figure 4:
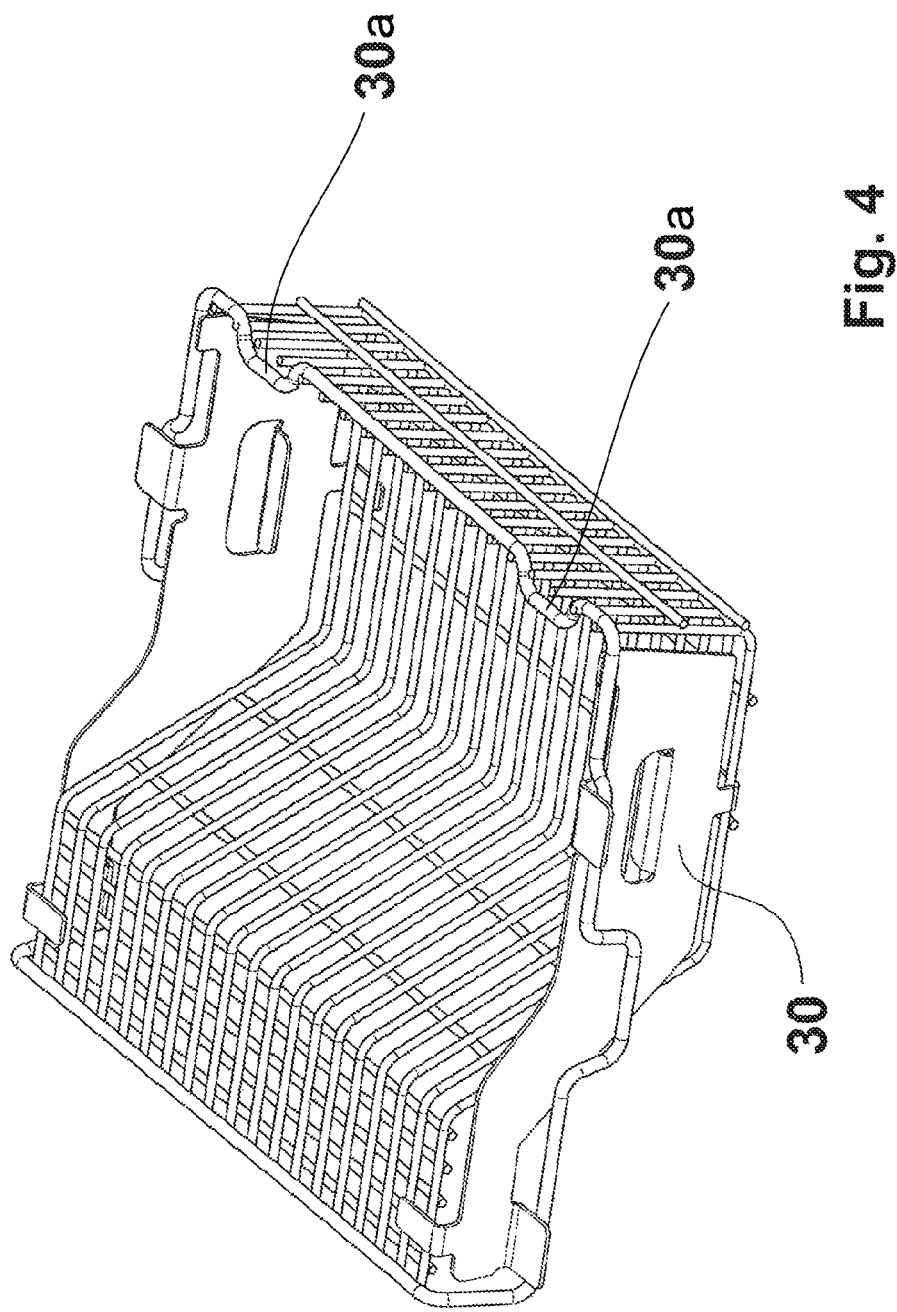
FIG. 4 shows a perspective view of a trough for a cage according to one embodiment of the present invention.

The cage according to one embodiment of the present invention is identified as a whole in FIGS. 1 to 3 with numeral 10; as depicted, the cage 10 comprises a tray 11 designed to contain the litter for animals to be housed (possibly together with other accessories such as for example, trough 30 in FIG. 4), wherein the tray 11 substantially defines the space available to the animals. Again as depicted, the cage 10 comprises a closing cover 12 adapted to be positioned on tray 11 (and possibly fixed thereto by means of fastening means not shown) in the closing position in FIG. 1 (in which it stops the animals from leaving and also access to the inside of tray 11) and to be removed from tray 11, for example when there is a need for an operator to access the inside of tray 11 and/or when there is a need to carry out the operations summarized above, such as for example, changing the litter or similar operations. In detail, as depicted, tray 11 has a box-like shape (rectangular in the non-limiting example depicted in the drawings) and comprises a substantially flat bottom 13 and four opposed two-by-two side walls 16 joined to one another and joined to bottom 13 (extending from bottom 13). For the sake of conciseness, reference is indifferently made below to a single side wall 16 or also to the overall side wall 16, as mentioned formed by the four opposed two-by-two side walls. As depicted in FIG. 2, cover 12 comprises an actual main cover portion 17 comprising at least a substantially flat portion, from which a wall or side edge or edgeguard 18 extends in substantially transverse direction (substantially perpendicularly to the flat portion of cover 17). According to the embodiment depicted in FIG. 2, cover 12 comprises a grille, a depression for housing and positioning a container for drinking beverages, and also air intakes 19 for introducing and discharging ventilated and/or forced air into and from cage 10, respectively. In any case, the air intakes 19, as well as the grille and the aforesaid depression, are not essential for the objects of the present invention and therefore a detailed description thereof is omitted for the sake of conciseness.

Figure 6:
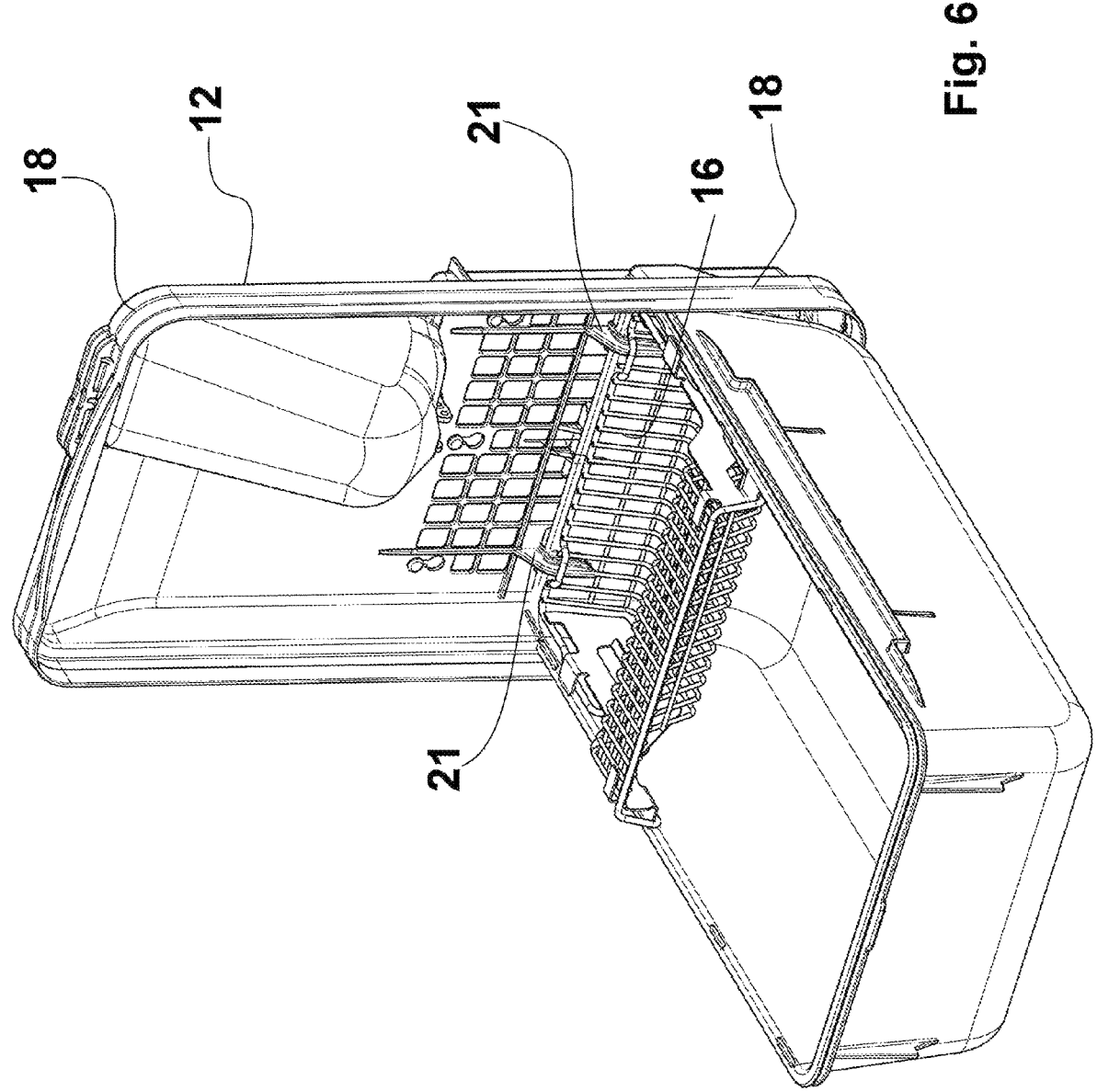
FIG. 6 shows a perspective view of a cage according to one embodiment of the present invention, with the cover in opening position.

Concerning the trough 30 in FIG. 4, according to methods which are essentially known and therefore are not described in detail, it is designed to be placed in cage 10, for example as depicted in FIG. 6, and is conformed so as to contain food and make it available to the animals, in particular so that the food does not come into contact with the litter. The trough 30 may include at least one trough seat 30a suitable for receiving an end extension portion of at least one hook 21 when the cover 12 is in an opening position, as will be explained in more detail below. Trough 30 is not essential either for the objects of the present invention.

Figure 7:
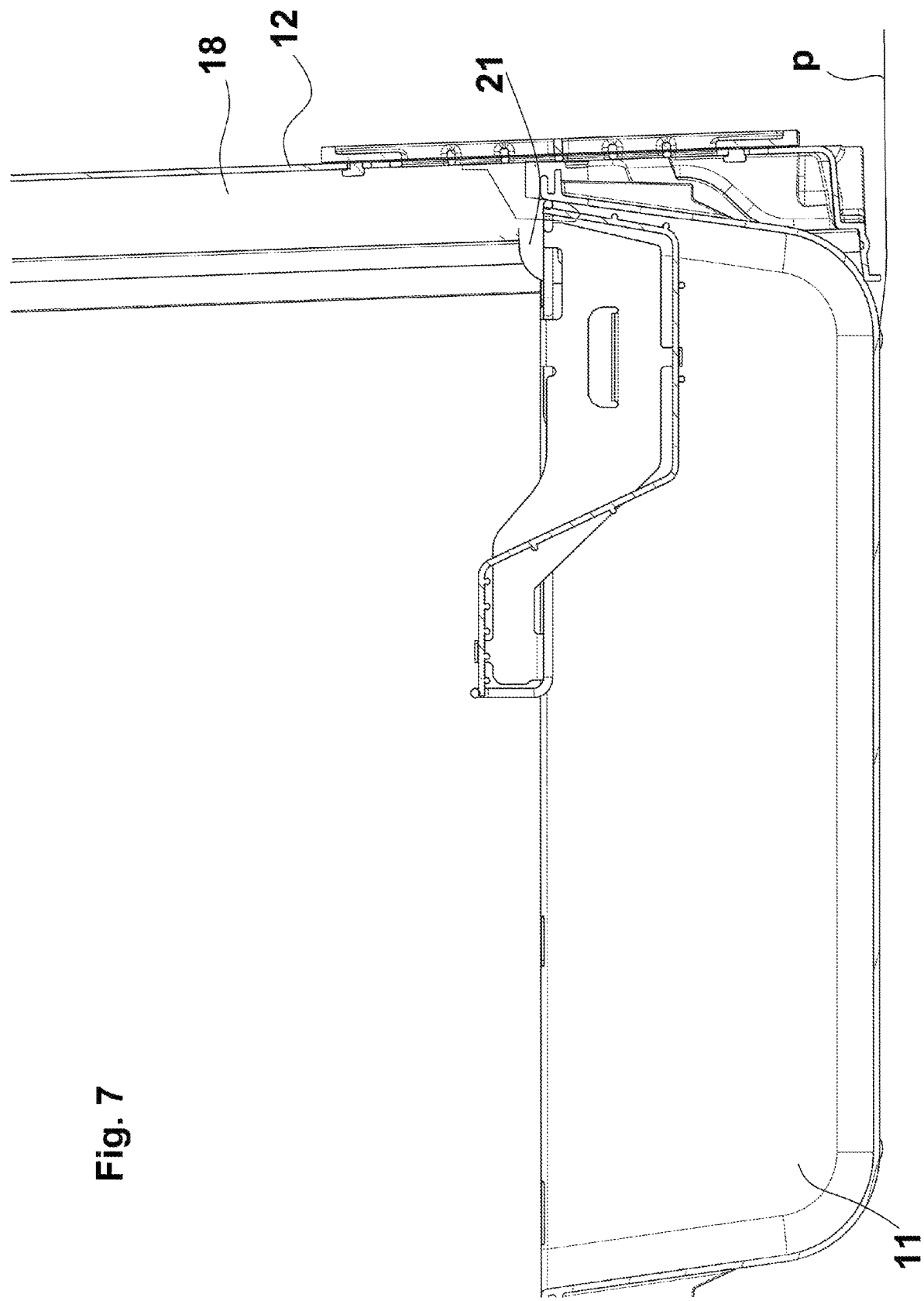
FIG. 7 shows a side view of a cage according to one embodiment of the present invention, with the cover in opening position.

Again as anticipated, the cage according to the present invention comprises peculiarities aiming to optimize the handling of cover 12; said peculiarities are described below with reference to FIGS. 5 to 7, in which component and/or characteristic parts of cage 10 according to the present invention described above with reference to other drawings, are identified by the same reference numerals.

Figure 5:
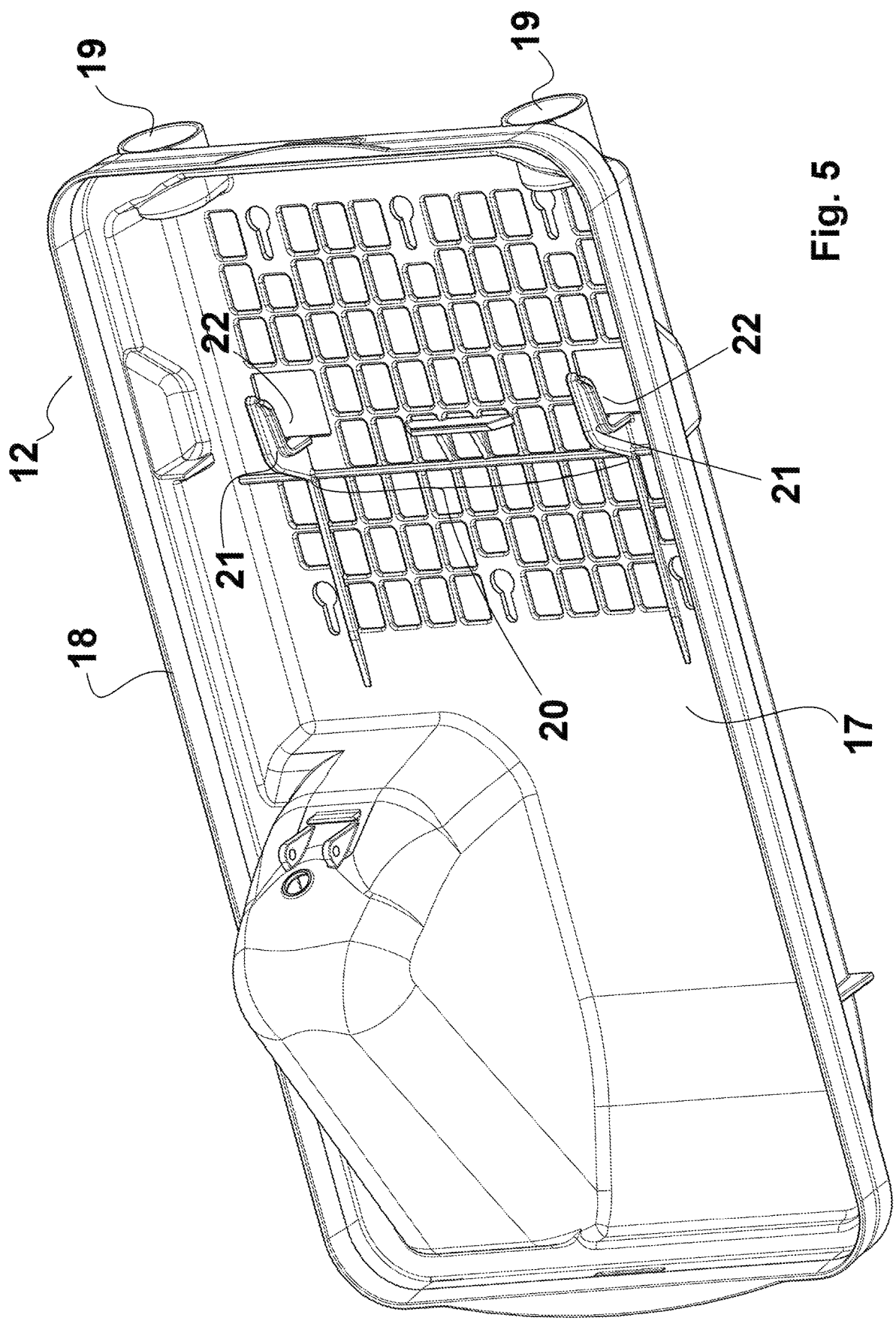
FIG. 5 shows a perspective view of a cover of a cage according to one embodiment of the present invention.
Figure 5A:
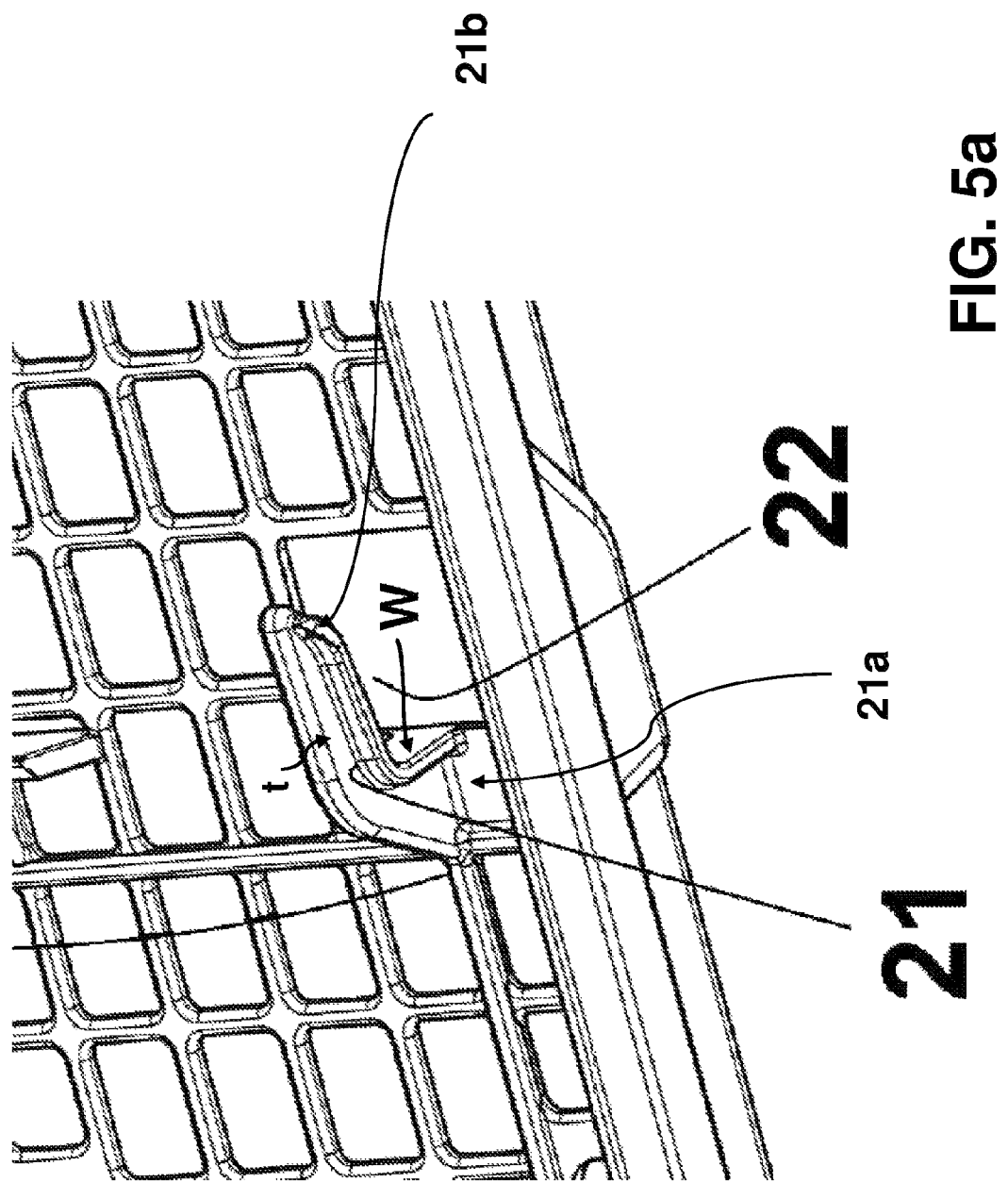
FIG. 5a shows a perspective view of details of a cover of a cage according to one embodiment of the present invention.

Numeral 20 in FIG. 5 identifies constraining means as a whole, adapted to allow the facilitated positioning of cover 12 in an opening position different from the closing position in FIG. 1, in which access to the inside 14 of cage 11 may in particular be possible. Said constraining means 20 essentially comprise a pair of substantially identical hooks 21, wherein again for conciseness reasons, a detailed description will be given below of one hook 21 alone.

As depicted, hook 21 extends from the inner surface of the cover portion 17 (that facing the inside 14 of tray 11 with cover 12 in the closing position in FIG. 1) and comprises a first extension portion substantially perpendicular to the cover portion 17, and an end extension portion which direction of extension lies on a plane which is substantially parallel to the cover portion 17. Therefore, hook 21 defines an engagement and housing seat 22 which function is described in greater detail below with reference to the other drawings.

As depicted, each hook 21 comprises a hook shaped support portion 21a with predefined substantially constant thickness t (in a direction perpendicular to the direction along which the extension portion extends or, in other words, in a direction parallel to the direction along which the two hooks 21 are opposite to each other).

Moreover, each hook 21 comprises an engagement portion 21b (provided to engage portions of the tray 11 as described in more detail below), said engagement portion 21b having a width w (in a direction perpendicular to the direction along which the extension portion extends or, in other words, in the direction of the thickness t of the support portion 21a) which is greater than the thickness t of said support portion).

It is moreover worth noting how both hooks are arranged inside the space defined by the side edge 18 of cover 12 at a predefined distance from the edge itself so that none of the hooks 21 engages or is in contact with any portion of tray 11 with cover 12 in the closing position in FIG. 1. The hooks 21 therefore do not stop the removal and separation of cover 12 from the position in FIG. 1, for example by raising, should there for example be a need to remove cover 12 and separate it from tray 11, for example by positioning it on the work surface of a change cabinet. Thus, the hooks 21 allow repositioning cover 12 according to the following methods.

By raising the end of cover 12 opposite to the end including the air intakes 19 (the end opposite the seats 22), and therefore to that towards which the hooks 21 are facing, and by translating it to rest on tray 11, the hooks 21, in particular the ends thereof, will engage (strike) the inner surface of the side wall 16 of tray 11. At this point, with the ends of the hooks 21 in contact with the inner surface of the side wall 16, the hooks 21 progressively engage respective end portions of the side wall 16 close to the upper edge of the side wall 16 by means of further rotation of cover 12 (clockwise with respect to FIG. 6), wherein a respective end portion of the side wall 16 will be housed, in the end opening position in FIG. 6, in the housing and engagement seat 22 of each of the hooks 21, as mentioned close to the upper edge of the side wall 16, and wherein a respective portion of the inner surface of the side wall 16 will be engaged (in contact with) the engagement portion 21b of each of the hooks 21. The mutual engagement of the hooks 21 and of the side wall 16 gives stability to cover 12 in the opening position in FIG. 6, wherein said stability is further improved by the engagement portions 21b (with width w greater than the thickness t of the respective support portion 21a), and wherein therefore there may be access and access is allowed to the inside of tray 11, without any risk of cover 12 accidentally switching (returning) to the opening position in FIG. 1 or detaching from tray 11, for example falling back onto the plane of a change cabinet. Obviously, the operations for repositioning cover 12 from the opening position in FIG. 6 to the closing one in FIG. 1 are opposite or inverted to those described above for switching from the closing position to the opening one, and therefore a detailed description thereof is omitted for conciseness reasons.

Moreover, in addition to the advantages related to the facilitated switching of the cover, it is worth noting how the system described ensures further advantages concerning the actual position of cover 12 in the opening position in FIG. 6. Firstly, it is worth noting that one portion alone of the edge 18 of cover 12 is in contact with the outer surface of tray 11. Moreover, cover 12 substantially is parallel to the side wall 16, wherein therefore, also in the opening position in FIG. 6, the mutual engagement of the hooks 21 and of the side wall 16 does not stop cover 12 from being separated from tray 11, for example to be placed on the work surface of a change cabinet; contrarily, it will be required for this purpose to raise the cover, thereby releasing the hooks 21 from the side wall 16. Moreover, as shown in FIG. 7, with tray 11 resting on a work surface P, cover 12 is raised with respect to plane P, wherein no part or portion of cover 12 is in contact with said plane P.

Figure 8:
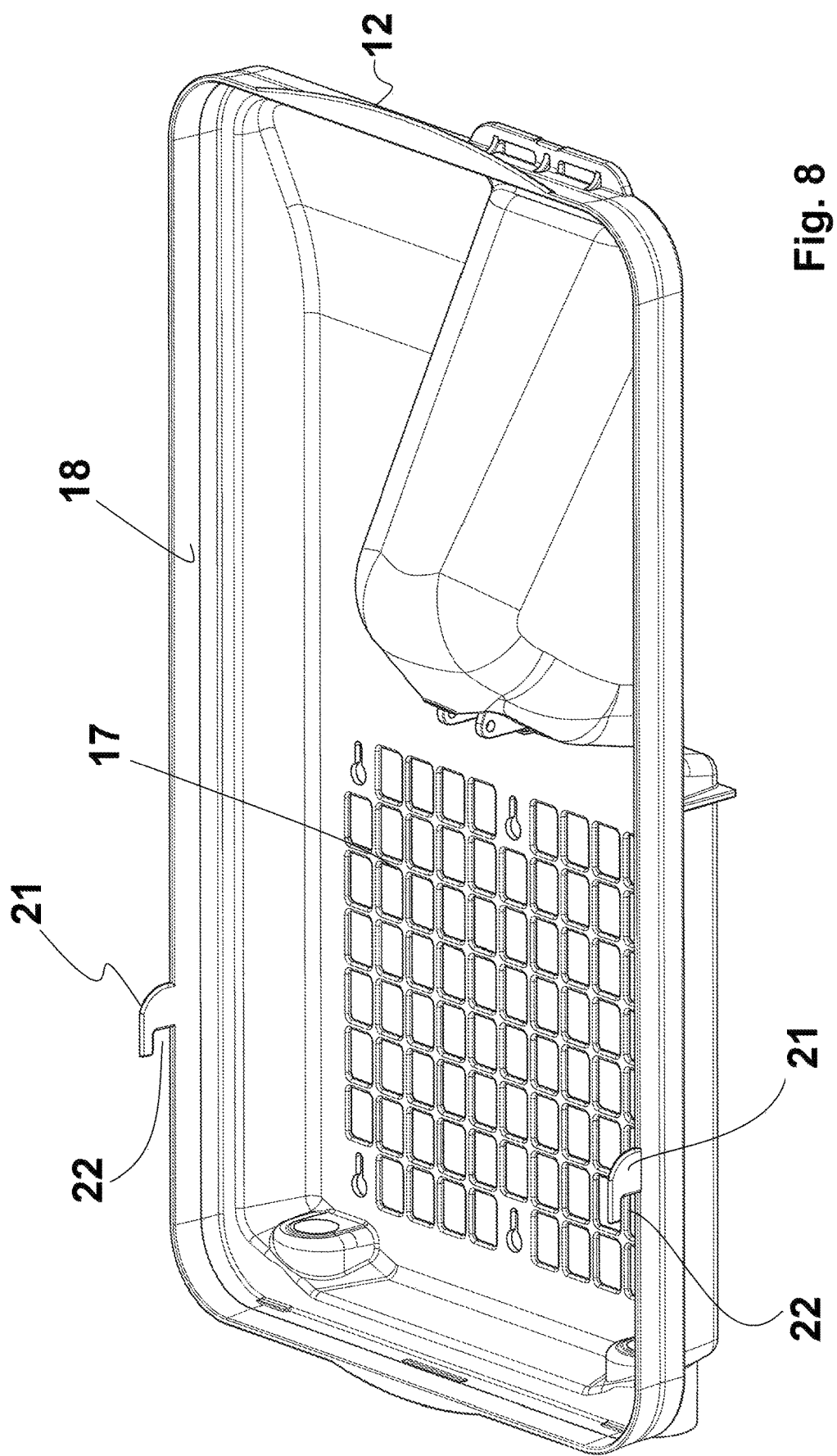

With reference to FIGS. 8 and 9, a description is given below of a further embodiment of cage 10 according to the present invention; component parts and/or features of same already described with reference to other drawings are also identified by the same numerals in FIGS. 8 and 9.

As shown in FIGS. 8 and 9, according to the embodiment depicted therein, the shape of the hooks 21 substantially corresponds to that of the support portions 21a of the hooks 21 according to the embodiment described above; indeed, the hooks 21 have substantially constant thickness t and each of them defines a housing and engagement seat 22 which is entirely similar to that defined by the hooks depicted for example, in FIG. 5. Thus, in the case of this further embodiment, the placement of the hooks 21 differs from that of the hooks according to the preceding embodiment. Here indeed, the hooks 21 do not extend from the inner surface of the cover portion 17 of cover 12, rather from the side edge or edgeguard 18, thus each defining an extension which substantially is parallel to the direction of extension of edgeguard 18. Therefore, the hooks 21 are positioned more outwardly. Concerning tray 11, each of the two opposed side walls 16 comprises a portion which extends from the wall itself outwards of the tray to define an engagement slot 40. With cover 12 in the opening position in FIG. 9, each of the hooks 21 engages a related slot 40, wherein a portion of slot 40 is housed in the housing and engagement seat 22 of hook 22.

The switching methods of cover 12 from the closing position to the opening one and vice versa, as well as the rest of the arrangement of cover 12 with respect to tray 11 in the opening position in FIG. 9, substantially correspond to those described above, wherein a detailed description thereof is omitted for the sake of conciseness. The embodiment depicted in FIGS. 8 and 9 has the advantage that, during the switching of cover 12, the risk of interference of the hooks 21 is avoided with components or accessories inside tray 11 due to the "external" position of the hooks 21, wherein contrarily, the arrangement of the hooks 21 according to the embodiment of FIGS. 5 to 7 may result in the need to adapt the shape and/or the position of said accessories, for example of trough 30. Moreover, also in the case of this embodiment, no part or portion of tray 11 is engaged or even only in contact with the hooks 21 with cover 12 in closing position.

Moreover, as apparent to those skilled in the art, each of the hooks 21 may be configured exactly as the hooks according to the previous embodiment, namely so as to comprise a support portion with a predefined thickness and an engagement portion with a predefined width greater than said thickness of said support portion, the slots 40 being in this case shaped and dimensioned so as to match with the respective hooks 21.

Moreover, in both embodiments, the hooks and/or the respective slots can be configured so as to allow the cover 12, in the closing position, to be removed from the tray 11, for instance by raising or lifting said cover 12.

It has therefore been demonstrated by the detailed description above of the embodiments of the present invention depicted in the drawings, that the present invention allows the desired results to be obtained and the drawbacks encountered in the prior art to be overcome or at least limited.

In particular, switching methods of cover 12 which are entirely impossible in the case of cages according to the prior art, are made possible by the present invention. In detail, such switching methods, which are entirely novel, allow opening the cage by means of switching cover 12 with no need to separate cover 12 from the tray 11, wherein moreover, cover 12 may be separated from tray 11, if required, according to methods substantially corresponding to those for separating the cover from the tray in the case of cages according to the prior art, in particular with cover 12 in both the opening and closing positions. In other words, there is absolutely no need to switch cover 12 beforehand into the opening position in order to separate cover 12 from cage 11 with the cover in closing position, wherein in the same way, there is no need to switch cover 12 beforehand from the opening position to the closing one to separate cover 12 from tray 11 with the cover in opening position.

Although the present invention was clarified above by means of a detailed description of the embodiments thereof depicted in the drawings, the present invention is not limited to the embodiments described and depicted in the drawings; contrarily, all those variants and/or modifications of the embodiments described and depicted in the accompanying drawings, which are clear and apparent to persons skilled in the art, fall within the scope of the present invention.

For example, the number of hooks 21 may vary and be selected according to the needs and/or circumstances. Likewise, the orientation of the hooks may be selected so that the hooks 21, with the cover in the opening position, engage any one of the side walls 16 of tray 11.

Moreover, constraining means 20 of magnetic type fall within the scope of the present invention, including for example magnets fastened to the cover and to the tray.

Finally, it is to be considered that the solution for repositioning the cover according to the present invention is applicable to covers of any type, in particular for non-ventilated cages as well.

In particular, although in the embodiments as depicted in the drawings and as disclosed above, the cover comprises a grid, covers without any grid fall as well within the scope of the present invention.

Moreover, although for those covers which comprise a grid, the hooks 21 are provided in correspondence of the grid (extending down from the crossing elements of the grid), according to embodiments of the present invention the hooks can be provided outside the grid, in particular beside the grid with reference to the longitudinal direction of extension of the cover.

The scope of protection of the present invention is therefore defined by the claims.

What is claimed is:

1. A cage for housing laboratory animals, said cage comprising a tray and a cover, the cover being removable from the tray and switchable between a first closing position, in which the cover is positioned to prevent access to an internal space delimited by said tray, and a second opening position, in which the cover is positioned to allow access to said internal space, said cover comprising a main cover portion having at least a substantially flat portion, a side edge portion extending in a direction substantially perpendicular to the main cover portion and one or more hooks comprising:
   a first extension portion extending from an inner surface of the main cover portion in a first direction substantially perpendicular to the substantially flat portion, and an end extension portion which extends from the first extension portion in a second direction substantially parallel to the substantially flat portion; and
   an engagement portion configured to engage with at least one portion of an inner surface of a side wall of said tray;
   wherein in said first closing position, the hooks are configured to extend into the internal space without contacting any portion of said tray, and wherein, in said second opening position, the engagement portion of each hook is configured to engage with a portion of an inner surface of a side wall of said tray so as to position at least one portion of the main cover portion adjacent to a side wall of said tray and outside of the internal space;

wherein in said second opening position one portion of the side edge portion of the cover is in contact with a portion of said tray which is arranged between a substantially flat bottom of the tray and the side wall of the tray that is configured for engagement by the hooks in said second opening position at least one trough configured for placement inside said cage, wherein the trough is provided with at least one trough seat suitable for receiving the end extension portion of at least one hook of said one or more hooks, so that in said second opening position this end extension portion is received in this recess and is arranged between the trough and the portion of the inner surface of the side wall of said tray that is configured for engagement by the engagement portion of this hook.

2. The cage according to claim 1, wherein each hook is configured such that when said cover is in said second opening position with at least one portion of said main cover portion adjacent to a side wall of the tray the substantially flat portion is substantially parallel to that side wall of the tray.

3. The cage according to claim 1, wherein each hook is configured such that when said cover is in said second opening position and said tray is resting on a planar work surface, said cover is adjacent to said planar work surface and raised in respect to said planar work surface such that no portion of said cover is in contact with said planar work surface.

4. The cage according to claim 1, wherein the portion of the inner surface of the side wall that is configured for engagement by each hook is an end portion of said side wall close to the upper edge of said side wall.

5. The cage according to claim 1, wherein the portion of the inner surface of the side wall that is configured for engagement by each hook is an end portion of said side wall which extends outwards from said tray.

6. The cage according to claim 1, wherein said cover further defines a depression adapted to at least partially house a container for liquids.

7. The cage according to claim 1, wherein said cover comprises a ventilation inlet for introducing ventilated air into said cage.

8. The cage according to claim 1, wherein said cover is configured to be completely removable from said tray.

9. The cage according to claim 1, wherein the height of said tray is substantially equal to the distance between the first extension portion of the hooks and the portion of the side edge portion of the cover suitable to contact the outer surface of the tray in said second opening position.

10. The cage according to claim 1, wherein said portion of the side edge portion of the cover in contact with the outer surface of the tray in said second opening position is substantially aligned with a substantially flat bottom of the tray.

11. The cage according to claim 1, wherein said at least one trough seat of the trough is a recess formed on one edge of the trough.

12. The cage according to claim 1, wherein the trough is arranged under the hooks in said first closing position.

13. The cage according to claim 1, wherein the first extension portion of the hooks is integral with, and rigidly extending from, the inner surface of the main cover.

14. The cage according to claim 1, wherein the first extension portion and the end extension portion of the hooks form a support portion having a substantially constant thickness t along a third direction perpendicular to the first and second directions of the first extension portion and the end extension portion, respectively.

15. The cage according to claim 14, wherein the engagement portion of the hooks has a substantially constant width w along the third direction, the substantially constant width w being greater than the thickness t of the support portion.

* * * * *